United States Patent
Toba et al.

(10) Patent No.: US 11,750,424 B2
(45) Date of Patent: Sep. 5, 2023

(54) ELECTRONIC CONTROL UNIT AND DETERMINATION METHOD

(71) Applicant: Hitachi Astemo, Ltd., Hitachinaka (JP)

(72) Inventors: Tadanobu Toba, Tokyo (JP); Kenichi Shimbo, Tokyo (JP); Nozomi Kasahara, Tokyo (JP); Yutaka Uematsu, Tokyo (JP); Hideyuki Sakamoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 239 days.

(21) Appl. No.: 17/428,095

(22) PCT Filed: Feb. 7, 2020

(86) PCT No.: PCT/JP2020/004979
§ 371 (c)(1),
(2) Date: Aug. 3, 2021

(87) PCT Pub. No.: WO2020/162628
PCT Pub. Date: Aug. 13, 2020

(65) Prior Publication Data
US 2022/0029866 A1    Jan. 27, 2022

(30) Foreign Application Priority Data

Feb. 8, 2019 (JP) ................................. 2019-022025

(51) Int. Cl.
*H04L 25/03* (2006.01)
*H04B 3/46* (2015.01)
*H04L 67/12* (2022.01)

(52) U.S. Cl.
CPC ......... *H04L 25/03885* (2013.01); *H04B 3/46* (2013.01); *H04L 67/12* (2013.01)

(58) Field of Classification Search
CPC ..... H04L 25/03885; H04L 2012/40215; H04L 12/40; H04L 67/12; H04L 2012/40267; H04L 2012/40273; H04B 3/46
See application file for complete search history.

(56) References Cited

U.S. PATENT DOCUMENTS

2017/0322558 A1*  11/2017  Teshima .................. B60Q 3/20
2018/0308353 A1*  10/2018  He ....................... G08G 1/0112
(Continued)

FOREIGN PATENT DOCUMENTS

JP     H10-124766 A    5/1998
JP     2002-280936 A   9/2002
(Continued)

OTHER PUBLICATIONS

International Search Report with English translation and Written Opinion issued in corresponding application No. PCT/JP2020/004979 dated Apr. 14, 2020.

*Primary Examiner* — Khanh C Tran
(74) *Attorney, Agent, or Firm* — Foley & Lardner LLP (57) ABSTRACT

An electronic control unit is mounted on a vehicle, and includes a reception unit that receives a data signal transmitted via a transmission path mounted on the vehicle; an environmental information acquisition unit that acquires environmental information of the vehicle; and a determination unit that determines the state of the transmission path, in which the reception unit includes an equalizer that compensates for the data signal, the equalizer calculates a compensation parameter for compensating for the data signal, and the determination unit determines the state of the transmission path based on the compensation parameter and the environmental information.

9 Claims, 9 Drawing Sheets

(56) References Cited

U.S. PATENT DOCUMENTS

| | | | |
|---|---|---|---|
| 2019/0391582 A1* | 12/2019 | Jung | G06N 20/00 |
| 2020/0090522 A1* | 3/2020 | Emura | G05D 1/0219 |
| 2020/0233655 A1* | 7/2020 | Watanabe | G06F 11/0793 |
| 2020/0255030 A1* | 8/2020 | Yamamoto | G01S 17/931 |
| 2021/0112482 A1* | 4/2021 | Nomura | H04W 40/20 |
| 2022/0159627 A1* | 5/2022 | Thomas | H04W 72/02 |

FOREIGN PATENT DOCUMENTS

| | | |
|---|---|---|
| JP | 2016-163117 A | 9/2016 |
| JP | 2017-092621 A | 5/2017 |

\* cited by examiner

| COMPENSATION PARAMETER | PARAMETER CORRESPONDENCE INFORMATION ||||TRANSMISSION STATE |
| --- | --- | --- | --- | --- |
| | ENVIRONMENTAL INFORMATION |||  |
| | TEMPERATURE | HUMIDITY | VIBRATION | |
| 00000000 | LESS THAN 20 DEGREES (CELSIUS) | 0% | 0 TO 0.5G | NORMAL |
| 00000000 | 20 TO 40 DEGREES (CELSIUS) | 0% | 0 TO 0.5G | WARNING 1 |
| 00000000 | EQUAL TO OR GREATER THAN 40 DEGREES (CELSIUS) | 0% | 0 TO 0.5G | WARNING 2 |
| 00000000 | LESS THAN 20 DEGREES (CELSIUS) | 0% | 0.5 TO 1.5G | WARNING 1 |
| 00000000 | 20 TO 40 DEGREES (CELSIUS) | 0% | 0.5 TO 1.5G | NORMAL |
| . . . | . | . | . | . |
| 00000001 | LESS THAN 20 DEGREES (CELSIUS) | 0% | 0 TO 0.5G | NORMAL |
| . . . | . | . | . | . |
| . . . | . | . | . | . |

| RANKING INFORMATION | 92 |
|---|---|
| RANKING | COMPENSATION PARAMETER |
| 1 | 00000000 |
| 2 | 00100010 |
| 3 | 10100100 |
| 4 | 01001010 |
| 5 | 00000011 |
| . | . |
| . | . |
| 256 | 01000101 |

FIG. 6

| RANKING STATE INFORMATION | | | | |
|---|---|---|---|---|
| RANKING | ENVIRONMENTAL INFORMATION | | | TRANSMISSION STATE |
| | TEMPERATURE | HUMIDITY | VIBRATION | |
| 1-10 | - | - | - | NORMAL |
| 11-20 | LESS THAN 20 DEGREES (CELSIUS) | 0% | 0 TO 0.5G | NORMAL |
| 11-20 | 20 TO 40 DEGREES (CELSIUS) | 0% | 0 TO 0.5G | WARNING 1 |
| 11-20 | EQUAL TO OR GREATER THAN 40 DEGREES (CELSIUS) | 0% | 0 TO 0.5G | WARNING 2 |
| 11-20 | LESS THAN 20 DEGREES (CELSIUS) | 0% | 0.5 TO 1.5G | WARNING 1 |
| 11-20 | 20 TO 40 DEGREES (CELSIUS) | 0% | 0.5 TO 1.5G | NORMAL |
| . | . | . | . | . |
| 256 | - | - | - | ABNORMAL |

ELECTRONIC CONTROL UNIT AND DETERMINATION METHOD

TECHNICAL FIELD

The present invention relates to an electronic control unit and a determination method.

BACKGROUND ART

Electronic data handled in vehicles continue to increase, and there is an increasing demand for high-speed transmission/reception of large amount of data. There are many factors that adversely affect the data transmission path in a traveling vehicle. Although shielding can mitigate an adverse effect, it is difficult to eliminate all adverse effects, and there are also problems of materials and mounting cost. Therefore, it is required to determine the state of the transmission path and perform processing in accordance with the determination result. PTL 1 discloses a communication device including: a deterioration diagnosing unit for diagnosing deterioration of a communication system constituted via a wired or wireless transmission path; and a deterioration predicting unit for predicting the deterioration of the communication system on the basis of the diagnostic result of the deterioration diagnosing unit.

CITATION LIST

Patent Literature

PTL 1: JP 2017-92621 A

SUMMARY OF INVENTION

Technical Problem

In the invention described in PTL 1, the cost of diagnosis is high.

Solution to Problem

An electronic control unit according to a first aspect of the present invention is an electronic control unit mounted on a vehicle, the electronic control unit including: a reception unit that receives a data signal transmitted via a transmission path mounted on the vehicle; a collection unit that acquires environmental information of the vehicle; and a determination unit that determines a state of the transmission path, wherein the reception unit includes an equalizer that compensates for the data signal, the equalizer calculates a compensation parameter for compensating for the data signal, and the determination unit determines a state of the transmission path based on the compensation parameter and the environmental information.

A determination method according to a second aspect of the present invention is a determination method performed by an electronic control unit mounted on a vehicle, wherein the electronic control unit includes a reception unit that receives a data signal transmitted via a transmission path mounted on the vehicle, the reception unit includes an equalizer that compensates for the data signal, the method including: acquiring, by reception unit, the environmental information of the vehicle, and calculating, by the equalizer, a compensation parameter for compensating for the data signal, and determining, by the equalizer, a state of the transmission path based on the compensation parameter and the environmental information.

Advantageous Effects of Invention

According to the present invention, it is possible to determine the state of a transmission path at low cost. Problems, configurations, and effects other than those described above will be apparent from the description of embodiments.

DESCRIPTION OF EMBODIMENTS

Embodiments of the present invention will be described below with reference to the drawings. The following description and drawings are illustrative of the present invention and are omitted and simplified as appropriate for clarity in description. The present invention can also be carried out in various other forms. Unless otherwise specified, each component may be singular or plural.

In the following description, various types of information are sometimes described by expressions such as "table", "list", and "queue", but the various types of information may be expressed by a data structure other than these. In order to indicate independence from the data structure, "XX table", "XX list", and the like are sometimes called "XX information".

In the following description, processing performed by executing a program is sometimes described. By being executed by a processor (e.g. CPU and GPU), the program performs determined processing appropriately using a storage resource (e.g., memory) and/or an interface device (e.g., communication port), and hence the agent of processing may be the processor. Similarly, the agent of processing performed by executing the program may be a controller, a device, a system, a computer, or a node having a processor. The agent of processing performed by executing the program is only required to be a calculation unit, and may include a dedicated circuit (e.g., FPGA or ASIC) that performs specific processing.

First Embodiment

A first embodiment of an ECU that is the electronic control unit according to the present invention will be described with reference to FIGS. 1 to 3.

(System Configuration)

Figure 1:
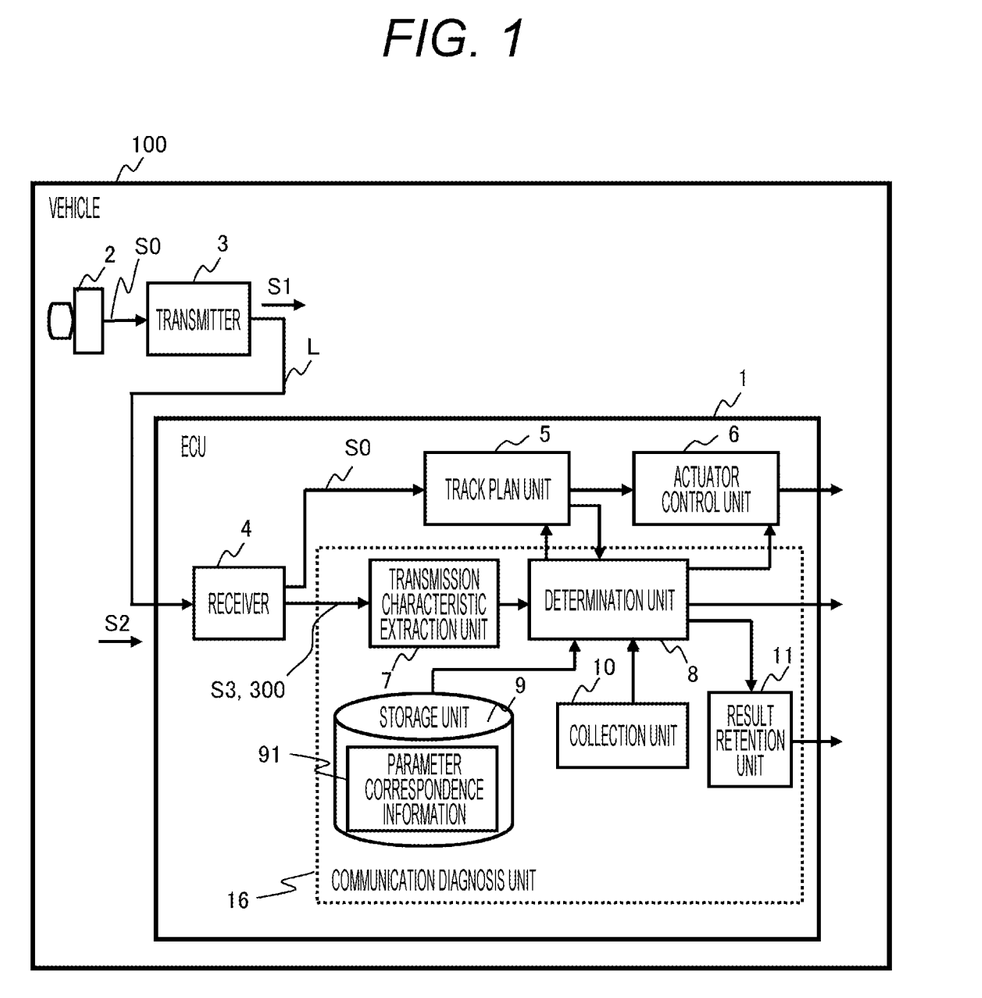
FIG. 1 is a system configuration diagram according to a first embodiment.

FIG. 1 is a system configuration diagram according to the first embodiment. A vehicle 100 includes an ECU 1, a sensor 2, and a transmitter 3. However, the transmitter 3 may be built in the sensor 2. The ECU 1 and the transmitter 3 are connected by a transmission path L. The sensor 2 is, for example, a camera, and transmits a photographed image that is an image obtained by photographing, i.e., sensor data S0, to the ECU 1 via the transmitter 3. The transmitter is, for example, an electronic control unit. The transmitter 3 serializes the sensor data S0 output from the sensor 2 and serially transmits the sensor data S0 to the ECU 1 via the transmission path L. Hereinafter, the electric signal output from the transmitter 3 to the transmission path L is referred to as a signal S1.

The transmission path L has a predetermined length, for example, a length of several meters to several tens of meters, and depending on the frequency characteristic of the transmission path L, the signal S1 output from the transmitter 3 changes to a signal S2 when it is input to the receiver 4. The frequency characteristic of the transmission path L varies depending on the environmental condition of the transmission path L and other conditions. Environmental conditions include temperature, humidity, and acceleration. The other conditions include that the transmission path L receives compression/expansion force, and that the self-impedance changes due to deformation.

The ECU 1 includes the receiver 4, a track plan unit 5, an actuator control unit 6, and a diagnosis unit 16. The diagnosis unit 16 includes the transmission characteristic extraction unit 7, a determination unit 8, a storage unit 9, a collection unit 10, and a result retention unit 11. The ECU 1 may be implemented by any of a microcomputer, an ASIC, and a logic circuit, or may be implemented by a plurality of combinations, for example, a combination of a microcomputer and a logic circuit.

The receiver 4 has a known equalizer function. The receiver 4 combines the sensor data S0 from the signal S2 received from the transmitter 3 via the transmission path L, and outputs it to the track plan unit 5. The receiver 4 outputs a compensation parameter 300 of a built-in equalizer to the transmission characteristic extraction unit 7. The compensation parameter 300 and a reference numeral S3 will be described later.

Using the sensor data S0 received from the receiver 4, the track plan unit 5 calculates a track on which the vehicle 100 is going to travel, and outputs it to the actuator control unit 6 and the determination unit 8. The track plan unit 5 detects an obstacle existing around the vehicle 100 from the sensor data S0, for example, and calculates the track of the vehicle 100 so as to avoid the detected obstacle.

The actuator control unit 6 controls the vehicle 100 so that the vehicle 100 travels along the track of the vehicle 100 output from the track plan unit 5. The actuator control unit 6 controls the vehicle 100 by outputting an operation command to an engine, a braking device, and a steering mechanism that are not illustrated, for example. However, the actuator control unit 6 controls the vehicle 100 so as to follow the track output by the track plan unit as described above when the result of the state determination output from the determination unit 8 is "normal", but the actuator control unit 6 safely stops the vehicle 100 when the result of the state determination is "abnormal".

The operation of the transmission characteristic extraction unit 7 will be described later. With reference to the parameter correspondence information 91 stored in the storage unit 9, the determination unit 8 determines the transmission state corresponding to the compensation parameter 300 output from the transmission characteristic extraction unit 7 and the environmental information output from the collection unit 10. The determination unit 8 outputs the determined transmission state to the actuator control unit 6 and the result retention unit 11.

The storage unit 9 stores the parameter correspondence information 91. The parameter correspondence information 91 is a table indicating the relationship among the compensation parameter 300, the environmental information, and the transmission state. The parameter correspondence information 91 is created in advance based on an experiment or the like. Note that the parameter correspondence information 91 is only required to store the information indicating the relationship among the compensation parameter 300, the environmental information, and the transmission state, and the information may not be stored in a table format.

The collection unit 10 collects environmental information inside and outside the vehicle 100 by using a sensor not illustrated mounted on the vehicle 100. The environmental information includes, for example, temperature, humidity, and vibration. The collection unit 10 outputs the collected environmental information to the determination unit 8.

The result retention unit 11 retains the determination result output by the determination unit 8 and outputs the result at a predetermined timing. The predetermined timing may be a time interval determined in advance or a timing when the determination result output by the determination unit 8 changes. The output destination to which the result retention unit 11 outputs the determination result may be a device not illustrated mounted on the vehicle 100 or may be outside the vehicle 100. When the result retention unit 11 outputs the determination result to the outside of the vehicle 100, the ECU 1 may have a built-in wireless communication module, or a device mounted on the vehicle 100 other than the ECU 1 may include a wireless communication module.

(Details of Receiver 4 and Transmission Characteristic Extraction Unit 7)

Figure 2:
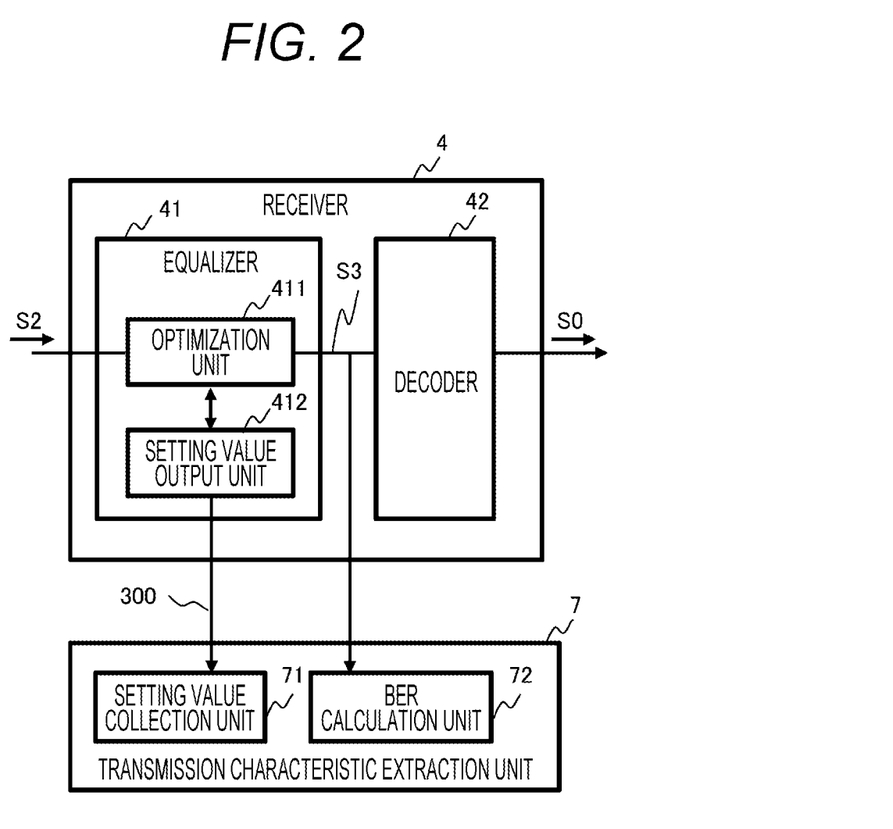
FIG. 2 is a functional configuration diagram of a receiver 4 and a transmission characteristic extraction unit 7.

FIG. 2 is a functional block diagram of the receiver and the transmission characteristic extraction unit 7. The receiver 4 includes an equalizer 41 and a decoder 42. The equalizer 41 includes an optimization unit 411 and a setting value output unit 412. The optimization unit 411 receives the signal S2 that has passed through the transmission path L, and outputs, to the decoder 42, the compensated signal S3 that compensates for the loss caused by the frequency characteristic of the transmission path L. Specifically, the optimization unit 411 determines the compensation parameter 300 for performing compensation and performs compensation using the compensation parameter 300. By this compensation, the signal S2 is compensated by the signal S3. The signal S3 desirably becomes equal to the signal S1 before being affected by the transmission by the transmission path L.

Decision of the compensation parameter 300 by the optimization unit 411 adopts a known method, for example, a decision feedback equalizer (DFE). The compensation parameter 300 is, for example, the presence/absence of compensation for each frequency component and the intensity of compensation. In the present embodiment, a description will be given on the assumption that there are 256 compensation patterns where the compensation parameter 300 is 8 bits, i.e., 2 to the power of eight. However, the number of bits of the compensation parameter 300 is not limited to 8 bits.

In the present embodiment, the value of the compensation parameter 300 is described as a scalar value, i.e., 00000000 to 11111111 for convenience, but there is no meaning in the magnitude of the scalar value. For example, the frequency characteristic of the transmission path L changes and the state of the transmission path L deteriorates due to physical compression on the transmission path L or temperature rise. However, there is no correlation between the degree of deterioration and the magnitude of the scalar value of the compensation parameter 300. This is because it is discretionary presence/absence of compensation for a certain frequency or to which digit of the scalar value the compensation intensity is assigned.

The setting value output unit 412 outputs the compensation parameter 300 determined by the optimization unit 411 to the transmission characteristic extraction unit 7. The decoder 42 deserializes the compensated signal S3 output by the equalizer 41 and outputs the sensor data S0 to the track plan unit 5.

The transmission characteristic extraction unit 7 includes a setting value collection unit 71 and a BER calculation unit 72. The setting value collection unit 71 acquires the compensation parameter 300 from the setting value output unit 412 of the receiver 4. The BER calculation unit 72 calculates a bit error rate for the compensated signal S3 output by the equalizer 41. Based on a known serialization method of the transmitter 3, the BER calculation unit 72 detects a bit error by using a predetermined rule, for example, a value of a parity bit in a specific signal pattern, and calculates an error occurrence rate. The calculation results of the setting value collection unit 71 and the BER calculation unit 72 are output to the determination unit 8.

(Parameter Correspondence Information 91)

Figure 3:
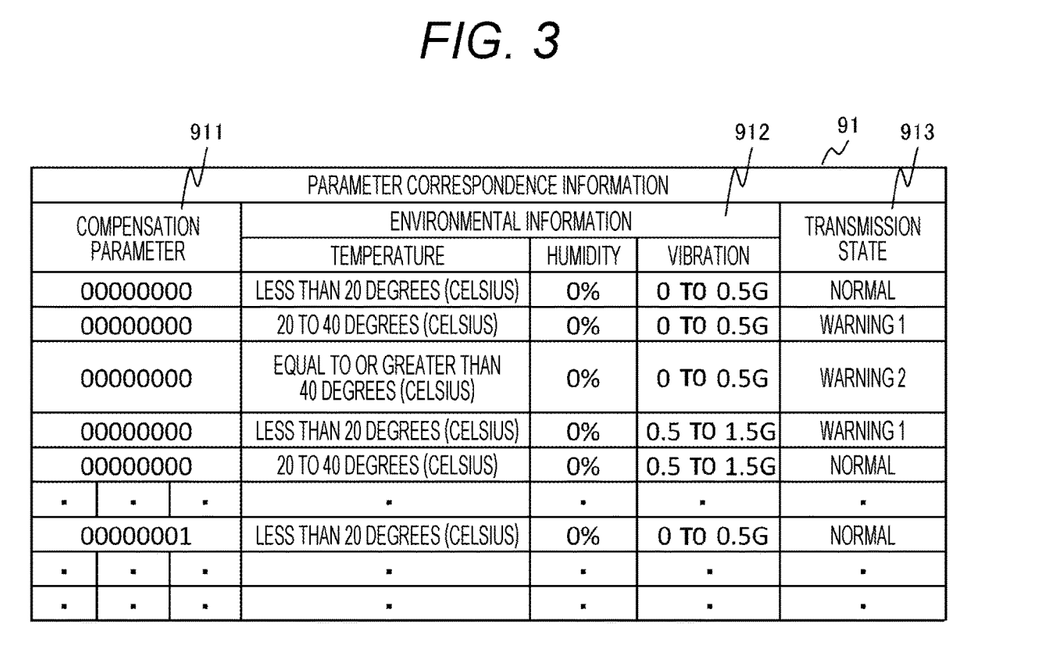
FIG. 3 is a view presenting an example of parameter correspondence information 91.

FIG. 3 is a view presenting an example of the parameter correspondence information 91. The parameter correspondence information 91 presented in FIG. 3 has fields of a compensation parameter 911, environmental information 912, and a transmission state 913. The field of the compensation parameter 911 stores bit by bit the value of the compensation parameter 300 calculated by the optimization unit 411. Although only "000" and "001" are presented in FIG. 3 due to space limitations, a total of eight combinations are all recorded.

The field of the environmental information 912 stores the environmental information collected by the collection unit 10, such as temperature, humidity, and vibration. Each of the temperature, humidity, and vibration may be stored as a single value such as humidity in the example of FIG. 3, or may be stored as a value having a range such as temperature and vibration in the example of FIG. 3. The field of the transmission state 913 stores information indicating the transmission state of the transmission path L. The value of the transmission state 913 is set in advance for each combination of the compensation parameter 911 and the environmental information 912. That is, even if the value of the compensation parameter 911 is the same, when the value of the environmental information 912 is different, the transmission state 913 may be set to a different value.

Furthermore, since the environmental information 912 is a combination of temperature, humidity, and vibration, the transmission state 913 is sometimes set to a different value when the vibration is different even if the compensation parameter 911, temperature, and humidity are the same. The transmission state 913 can take five states of normal, warning 1, warning 2, warning 3, and abnormal. However, the number of states is one example, and at least two states are required to be included.

According to the first embodiment described above, the following operation effects are obtained.

(1) The ECU 1 is mounted on the vehicle 100. The ECU 1 includes: the receiver 4 that receives the data signal S2 transmitted via the transmission path L mounted on the vehicle 100; the collection unit 10 that collects environmental information of the vehicle 100; and the determination unit 8 that determines the state of the transmission path L, in which the receiver 4 includes the equalizer 41 that compensates for the data signal S2, the equalizer 41 calculates the compensation parameter 300 for compensating for the data signal, and the determination unit 8 determines the state of the transmission path L based on the compensation parameter 300 and the environmental information. Therefore, the ECU 1 can determine the state of the transmission path L at low cost.

(2) The ECU 1 includes the storage unit 9 that stores the parameter correspondence information 91 that indicate the relationship among the compensation parameter 300, the environmental information, and the state of the transmission path. With reference to the parameter correspondence information 91, the determination unit 8 determines the state of the transmission path based on the compensation parameter 300 and the environmental information. Therefore, the ECU 1 can determine the state of the transmission path L at low cost with reference to the parameter correspondence information 91 stored in the storage unit 9.

Modification 1 of First Embodiment

The parameter correspondence information 91 may include a bit error rate calculated by the BER calculation unit 72. That is, the parameter correspondence information in this modification is a table indicating the relationship among the compensation parameter 300, the bit error rate, the environmental information, and the transmission state. In this case, the transmission characteristic extraction unit 7 also outputs the calculated bit error rate to the determination unit 8. With reference to the parameter correspondence information 91, the determination unit 8 specifies the transmission state based on the compensation parameter 300, the bit error rate, and the environmental information.

Modification 2 of First Embodiment

The environmental information is only required to include at least one of temperature, humidity, and vibration. The environmental information may also include other measurable values, such as the amount of ultraviolet light.

Second Embodiment

The second embodiment of the ECU that is an electronic control unit according to the present invention will be described with reference to FIGS. 4 to 6. In the following description, the same components as those in the first embodiment will be denoted by the same reference numerals, and the differences will be mainly described. The points not particularly described are the same as those of the first embodiment. The present embodiment is different from the first embodiment mainly in that the compensation parameters 300 are ranked.

Figure 4:
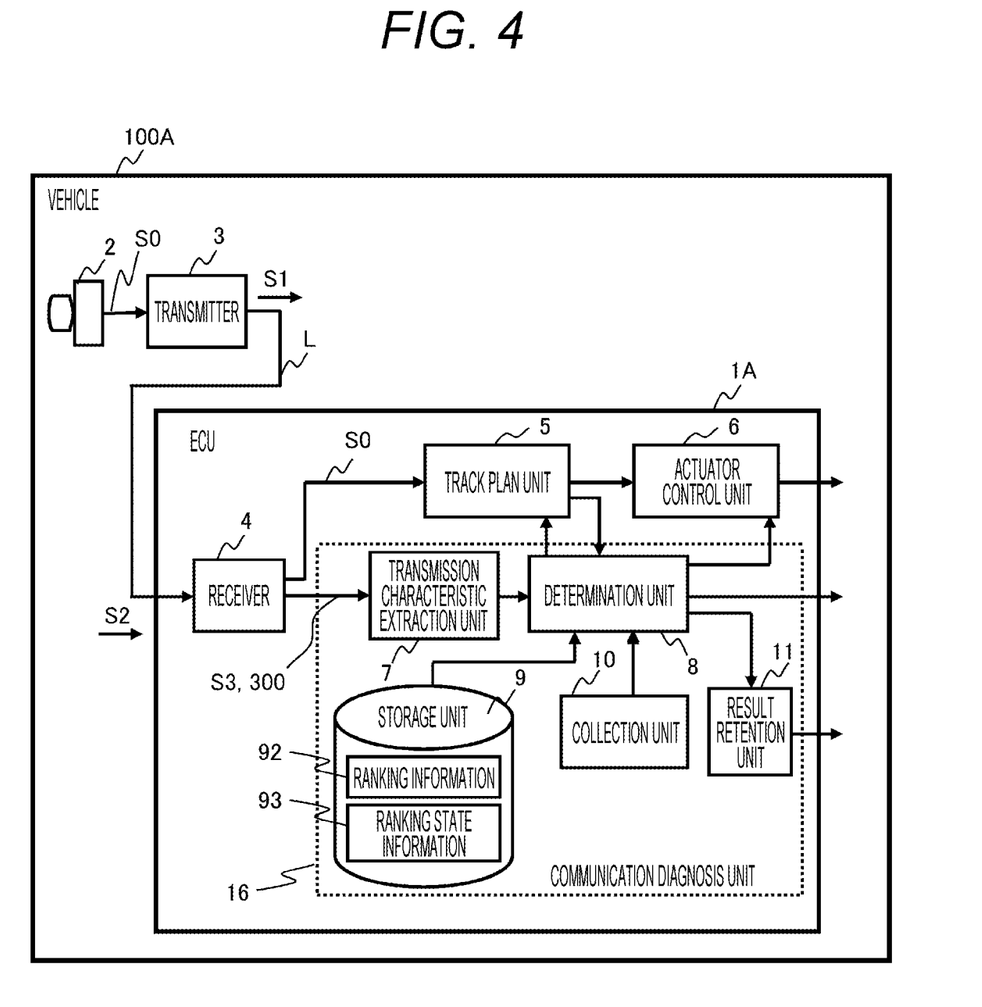
FIG. 4 is a system configuration diagram according to a second embodiment.

FIG. 4 is a system configuration diagram according to the second embodiment. An ECU 1A of the second embodiment is different from the ECU 1 of the first embodiment in the information stored in the storage unit 9. In the present embodiment, the storage unit 9 stores the ranking information and the ranking state information 93. The ranking information 92 is information in which the compensation parameters 300 can be rearranged in the order of the magnitude of influence given to the transmission path L. Hereinafter, the compensation parameters 300 arranged in an ascending order of the influence on the transmission path L from the outside are referred to as the "ranking of compensation parameters". For example, when the compensation parameter 300 is ranked top, it means that the transmission path L is hardly influenced by the outside. The ranking state information 93 is information indicating the relationship among the ranking of the compensation parameter 300, the environmental information, and the state of the transmission path.

Figure 5:
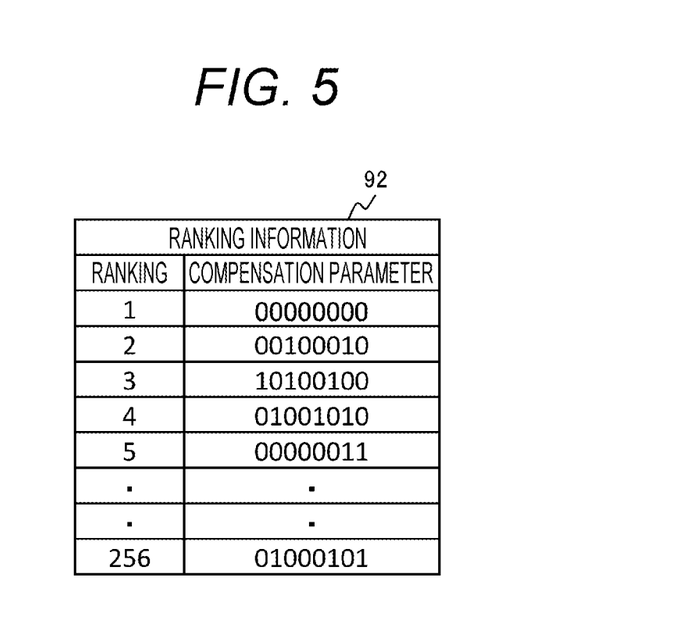
FIG. 5 is a view presenting an example of ranking information 92.

FIG. 5 is a view presenting an example of the ranking information 92. In the example presented in FIG. 5, since the compensation parameter 300 is 8 bits, the ranking is from 1 to 256. In the example presented in FIG. 5, the correspondence between the ranking and the compensation parameter 300 is presented, and the first, second, third, . . . are presented from the top.

Figure 6:
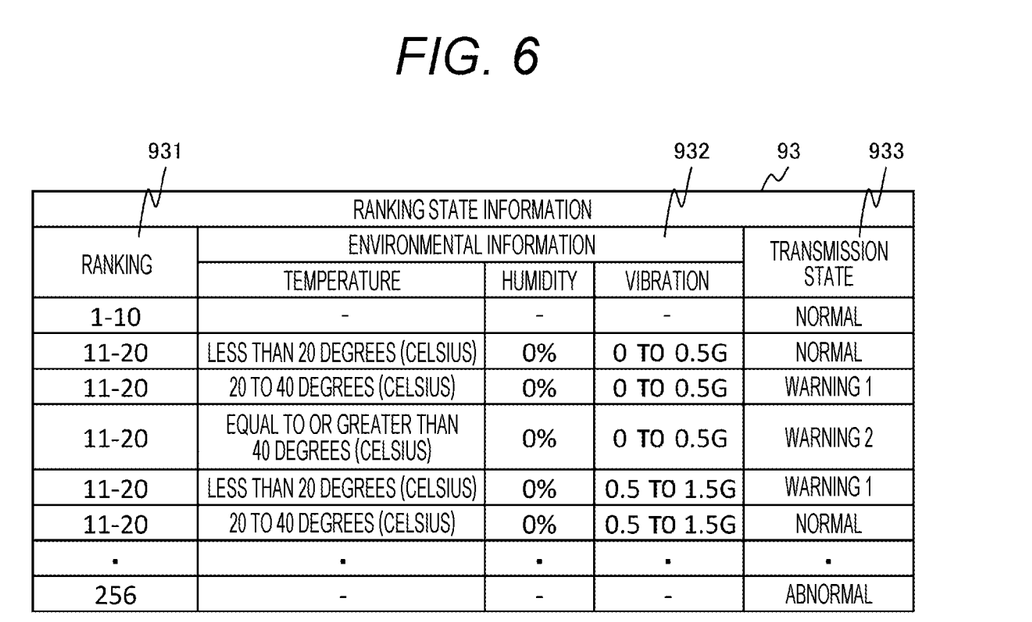
FIG. 6 is a view presenting an example of ranking state information 93.

FIG. 6 is a view presenting an example of the ranking state information 93. The ranking state information 93 presented in FIG. 6 has fields of a ranking 931, environmental information 932, and a transmission state 933. The field of the ranking 931 stores the value of the ranking of the compensation parameter 300. However, a plurality of rankings may be stored, and for example, as presented in the first record, the top to the tenth rankings may be collectively described. The fields of the environmental information 932 and the transmission state 933 are the same as those of the environmental information 912 and the transmission state 913 of the parameter correspondence information 91 in the first embodiment, and therefore description thereof is omitted.

In the present embodiment, with reference to the ranking information 92 and the ranking state information 93, the determination unit 8 determines the state of the transmission path based on the compensation parameter 300 and the environmental information. That is, the determination unit 8 refers to the ranking information 92 and the ranking state information 93 instead of the parameter correspondence information 91 in the first embodiment.

According to the second embodiment described above, the following operation effects are obtained.

(3) The ECU 1A includes the storage unit 9 that stores the ranking information 92 and the ranking state information 93. The ranking information 92 is information in which the values of the compensation parameters 300 can be rearranged in the order of the magnitude of influence given to the transmission path L. The ranking state information 93 is information indicating the relationship among the ranking, the environmental information, and the state of the transmission path. By referring to the ranking information 92 and the ranking state information 93, the determination unit 8 determines the state of the transmission path L based on the compensation parameter 300 and the environmental information.

Modification 1 of Second Embodiment

The determination unit 8 may change the determination on the state of the transmission path L in accordance with the speed of a vehicle 100A. For example, since there is a higher risk that a small matter causes a large problem when the vehicle 100A is traveling at a high speed than when the vehicle 100A is traveling at a low speed, the determination unit 8 strictly determines an abnormality. In other words, the determination unit 8 widens the range of determination of abnormality when the vehicle is traveling at a high speed. Specifically, the determination unit 8 offsets the ranking of the compensation parameter 300 in accordance with the speed of the vehicle 100A. Note that offsetting the ranking is equivalent to changing the threshold value for determining the transmission state.

The offset is to vary the ranking, and the amount of movement is discretionary. However, the ranking does not vary beyond a default minimum and maximum values. For example, when the ranking before the offset is "5" and the offset amount is "−10", the ranking is not "−5" but "1", which is the smallest ranking. For example, the determination unit 8 offsets the ranking by "−10" when the speed is less than 10 km/h, does not vary the ranking when the speed is 10 km/h or more and less than 20 km/h, offsets the ranking by "+10" when the speed is 20 km/h or more and less than 30 km/h, and offsets the ranking by "+20" when the speed is 30 km/h or more and less than 40 km/h. Also after this, the determination unit 8 increases the offset amount each time the speed of the vehicle 100A increases.

According to the present modification, the following operation effects are obtained.

(4) The collection unit 10 collects speed information of the vehicle 100A. The determination unit 8 offsets the ranking in accordance with the speed of the vehicle 100A. Therefore, the state of the transmission path can be evaluated in accordance with the situation.

Modification 2 of Second Embodiment

The determination unit 8 may determine the state of the transmission path L based on the transition of the ranking information. For example, according to the ranking state information 93, in a case where the transmission state is determined to be "abnormal" when the ranking becomes the 100th in a certain environmental condition, the transmission state may be determined to be "abnormal" before the ranking becomes the 100th in a case where the ranking is gradually increasing in the environmental condition.

According to the present modification, the following operation effects are obtained.

(5) The determination unit 8 determines the state of the transmission path based on the transition of the ranking information. Therefore, it is possible to detect a precursor of abnormality before the abnormality occurs.

Third Embodiment

The third embodiment of the ECU that is an electronic control unit according to the present invention will be described with reference to FIG. 7. In the following description, the same components as those in the first embodiment will be denoted by the same reference numerals, and the differences will be mainly described. The points not particularly described are the same as those of the first embodiment. The present embodiment is different from the first embodiment mainly in further including a report level selection unit.

Figure 7:
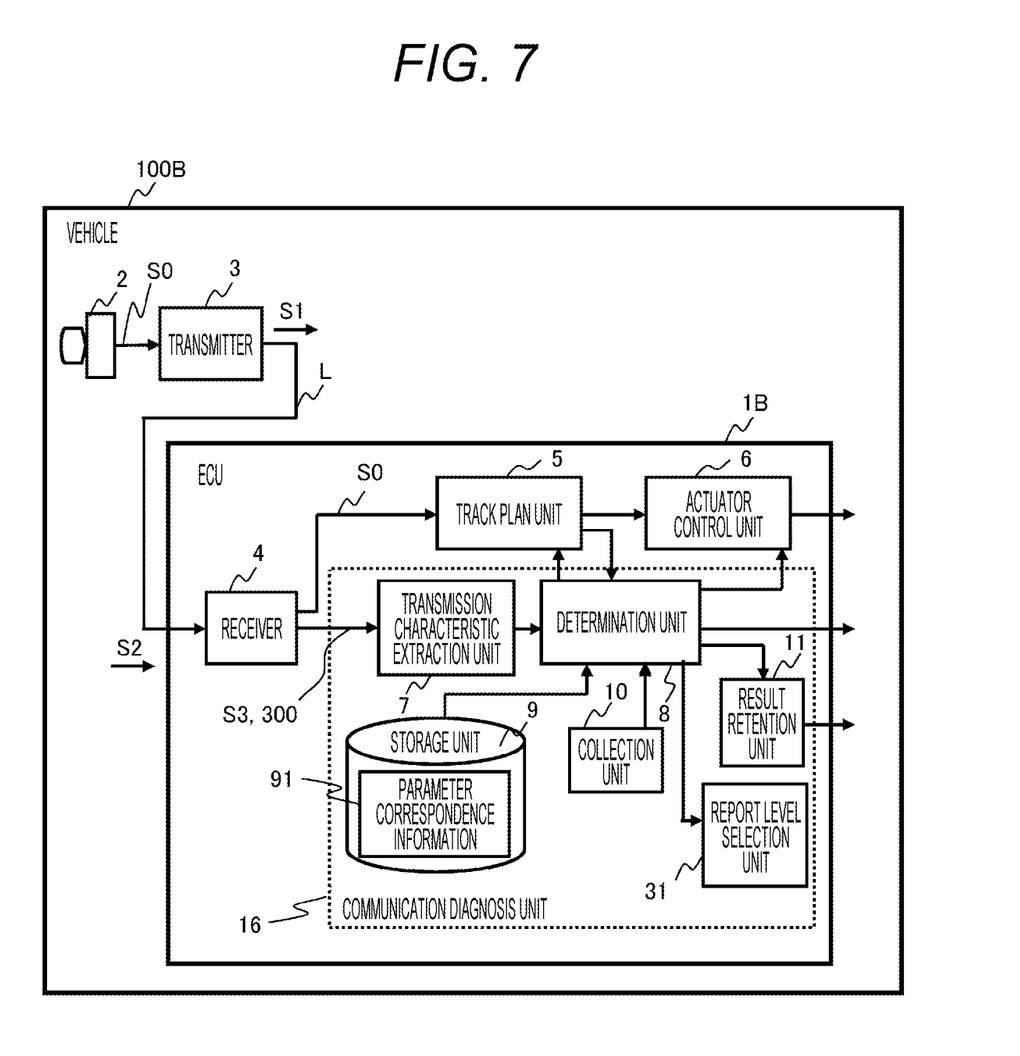
FIG. 7 is a system configuration diagram according to a third embodiment.

FIG. 7 is a system configuration diagram of an ECU 1B according to the third embodiment. The ECU 1B further includes a report level selection unit 31 in addition to the configuration in the first embodiment. The report level selection unit 31 reports to the outside of the ECU 1B only when the output of the determination unit 8 is a certain level or greater. The report is notification by communication. For example, when the report level of the report level selection unit 31 is set to "warning 3", the report level selection unit 31 reports when the output of _ is "warning 3" or "abnormal", and does not report when it is "normal", "warning 1", or "warning 2".

According to the third embodiment described above, it is possible to report only when the state of the transmission path has deteriorated to a predetermined level or more.

Modification of Third Embodiment

The report level selection unit 31 may change the output destination in accordance with the content of the report. In this case, the output destination is set in advance for each content of the report. For example, a report is made to a certain device X when the transmission state is "warning 3", and a report is made to another device Y when the transmission state is "abnormal". The number of output destinations may be changed in accordance with the transmission state.

According to the present modification, the following operation effects are obtained.

(6) The ECU 1B includes the report level selection unit 31 that reports the state of the transmission path determined by the determination unit 8. The report level selection unit 31 changes the report destination in accordance with the state of the transmission path.

Fourth Embodiment

The fourth embodiment of the ECU that is an electronic control unit according to the present invention will be described with reference to FIG. 8. In the following description, the same components as those in the first embodiment will be denoted by the same reference numerals, and the differences will be mainly described. The points not particularly described are the same as those of the first embodiment. The present embodiment is different from the first embodiment mainly in that the ECU includes an external environment communication unit.

Figure 8:
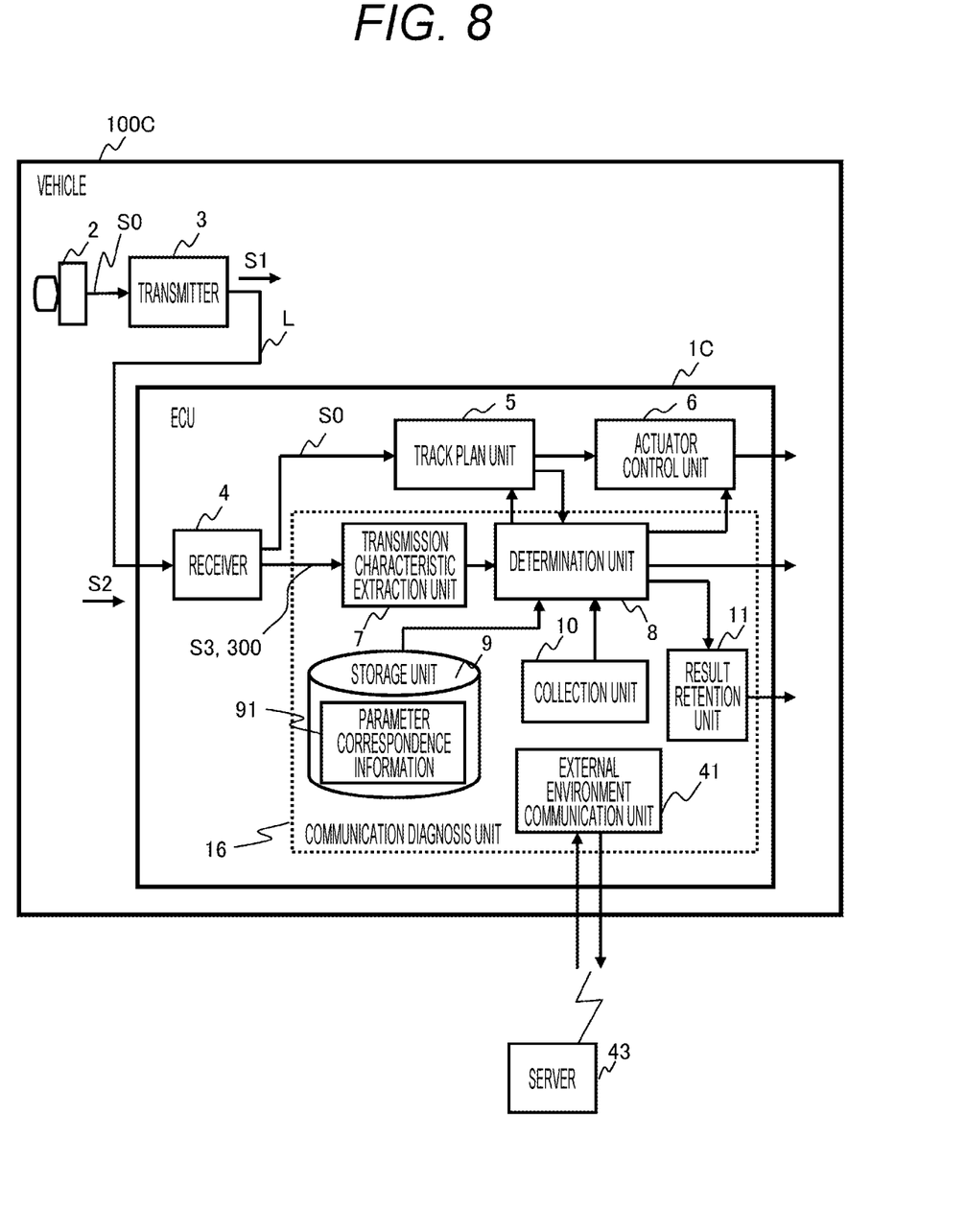
FIG. 8 is a system configuration diagram according to a fourth embodiment.

FIG. 8 is a system configuration diagram of an ECU 1C according to the present embodiment. The ECU 1C further includes an external environment communication unit 41 in addition to the configuration in the first embodiment. The external environment communication unit 41 is a communication module compatible with a wireless communication standard such as 4G. The external environment communication unit 41 communicates with a preset server 43 outside the vehicle. The external environment communication unit 41 transmits, to the server 43, the travel information of a vehicle 100C such as the environmental information collected by the collection unit 10, the compensation parameter 300, and the speed. The external environment communication unit 41 overwrites the storage unit 9 with the information of the parameter correspondence information 91 transmitted from the server 43 to update the parameter correspondence information 91.

The server 43 collects the environmental information, the compensation parameter 300, and the travel information of the vehicle from the plurality of ECUs 1C, and sets the value of the transmission state of the appropriate parameter correspondence information 91 for each condition. The value of the transmission state may be set by automatic processing or may be set by an operator of the server 43.

According to the fourth embodiment described above, the following operation effects are obtained.

(7) The ECU 1C includes the external environment communication unit 41 that transmits environmental information, the state of the transmission path L determined by the determination unit 8, and information on the speed of the vehicle 100 to the outside of the vehicle 100C, and receives the parameter correspondence information 91 from the outside of the vehicle 100C. Therefore, the ECU 1C can improve the parameter correspondence information 91 by using the server 43 existing outside the vehicle 100.

Modification 1 of Fourth Embodiment

The parameter correspondence information 91 stored in the storage unit 9 may be rewritten not via the external environment communication unit 41 at the time of maintenance or the like instead of being via the external environment communication unit 41 from the server 43.

Modification 2 of Fourth Embodiment

The ECU 1C may include a receiver constituting a satellite navigation system, for example, a GPS receiver. In this case, the external environment communication unit 41 may transmit the position information of the vehicle 100C and the time information to the server 43 together with the above-mentioned environmental information, the compensation parameter 300, and the travel information.

Modification 3 of Fourth Embodiment

The external environment communication unit 41 of the ECU 1C may receive the ranking state information 93 instead of receiving the parameter correspondence information 91 from the server 43. Note that since the ranking information 92 does not change, it does not have to receive.

Fifth Embodiment

The fifth embodiment of the ECU that is an electronic control unit according to the present invention will be described with reference to FIG. 9. In the following description, the same components as those in the first embodiment will be denoted by the same reference numerals, and the differences will be mainly described. The points not particularly described are the same as those of the first embodiment. The present embodiment is different from the first embodiment mainly in that a plurality of sets of sensors and transmission paths are provided.

The present embodiment is based on the following idea. That is, the plurality of transmission paths mounted on the vehicle should be similarly affected by the environment, and the tendencies of the influences are expected to be substantially the same. If the plurality of transmission paths are influenced differently, it is assumed that there is some abnormality in the transmission paths, for example, only one of the transmission paths is compressed.

Figure 9:
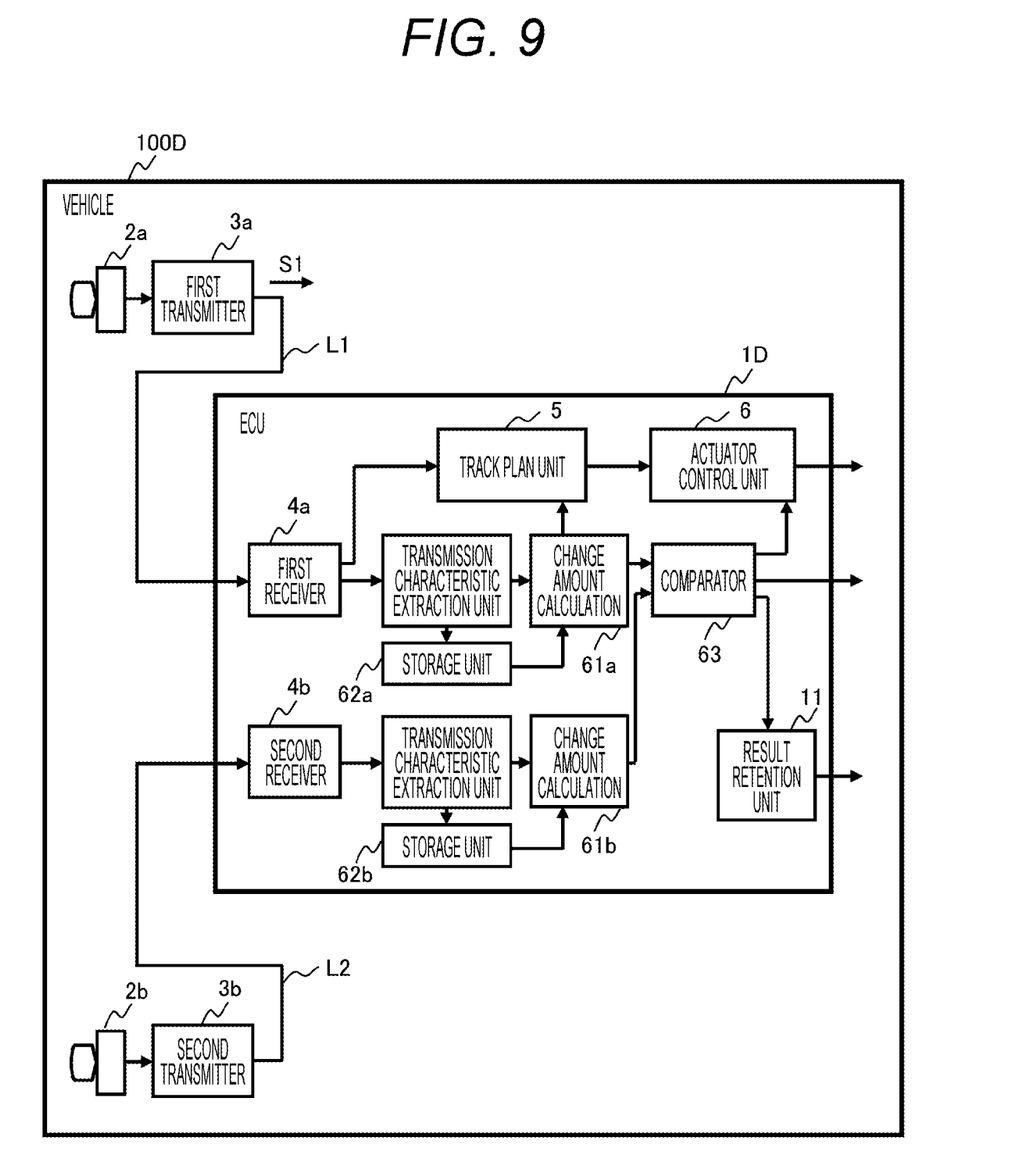
FIG. 9 is a system configuration diagram according to a fifth embodiment.

FIG. 9 is a system configuration diagram of an ECU 1D according to the fifth embodiment. In the present embodiment, a vehicle 100D includes a first sensor 2a, a second sensor 2b, a first transmitter 3a, a second transmitter 3b, and the ECU 1D. The sensor information acquired by the first sensor 2a is transmitted to the first transmitter 3a and further transmitted to the ECU 1D via a first transmission path L1. The sensor information acquired by the second sensor 2b is transmitted to the second transmitter 3b and further transmitted to the ECU 1D via a second transmission path L2. However, the lengths of the first transmission path L1 and the second transmission path L2 may not be the same.

In the present embodiment, the ECU 1D may not include the determination unit 8 and the collection unit 10. In the present embodiment, the parameter correspondence information 91 may not be stored in the storage unit 9. In the present embodiment, the ECU 1D includes a storage unit 62a and a storage unit 62b instead of the storage unit 9.

A transmission characteristic extraction unit 7a outputs the collected compensation parameter 300 to the storage unit 62a and a change amount calculation unit 61a. The change amount calculation unit 61a calculates a difference between the immediately preceding compensation parameter 300 stored in the storage unit 62a and the latest compensation parameter 300 output from the transmission characteristic extraction unit 7a, i.e., a change amount of the compensation parameter 300. The change amount calculation unit 61a outputs the calculated change amount to a comparator 63.

A transmission characteristic extraction unit 7b outputs the collected compensation parameter 300 to the storage unit 62b and a change amount calculation unit 61b. The change amount calculation unit 61b calculates a difference between the immediately preceding compensation parameter 300 stored in the storage unit 62b and the latest compensation parameter 300 output from the transmission characteristic extraction unit 7b, i.e., a change amount of the compensation parameter 300. The change amount calculation unit 61b outputs the calculated change amount to the comparator 63.

The comparator 63 compares the change amount output by the change amount calculation unit 61a with the change amount output by the change amount calculation unit 61b. The comparator 63 determines that it is normal when both are the same or the difference falls within a predetermined threshold value, and determines that it is abnormal when they are different or the difference is larger than the predetermined threshold value. The comparator 63 outputs the determination result to the actuator control unit 6, the result retention unit 11, and the outside of the ECU 1D.

According to the fifth embodiment described above, the following operation effects are obtained. The ECU 1D detects abnormality of a transmission path by comparing changes in frequency characteristics of a plurality of transmission paths provided in the vehicle 100D. Therefore, the abnormality in the transmission path can be detected without including any of the parameter correspondence information 91, the ranking information 92, and the ranking state information 93.

The above-described embodiments and modifications may be combined individually. Although various embodiments and modifications have been described above, the present invention is not limited thereto. Other aspects conceivable within the technical idea of the present invention are also included in the scope of the present invention.

The disclosure of the following priority application is incorporated herein by reference.

Japanese Patent Application No. 2019-22025 (filed on Feb. 8, 2019)

REFERENCE SIGNS LIST 1, 1A, 1B, 1C, 1D, 1E ECU
100, 100A, 100B, 100C, 100D, 100E vehicle
4 receiver
8 determination unit
9 storage unit
10 collection unit
91 parameter correspondence information
92 ranking information
93 ranking state information
300 compensation parameter
411 optimization unit
412 setting value output unit
911 compensation parameter
912 environmental information
913 transmission state
931 ranking
932 environmental information
933 transmission state
L, L1, L2 transmission path

The invention claimed is:

1. An electronic control unit mounted on a vehicle, the electronic control unit, comprising:
    a reception unit that receives a data signal transmitted via a transmission path mounted on the vehicle;
    a collection unit that acquires environmental information of the vehicle; and
    a determination unit that determines a state of the transmission path,
    wherein the reception unit includes an equalizer that compensates for the data signal,
    the equalizer calculates a compensation parameter for compensating for the data signal, and
    the determination unit determines a state of the transmission path based on the compensation parameter and the environmental information.

2. The electronic control unit according to claim 1, further comprising:
    a storage unit that stores parameter correspondence information indicating a relationship among the compensation parameter, the environmental information, and the state of the transmission path,
    wherein with reference to the parameter correspondence information, the determination unit determines a state of the transmission path based on the compensation parameter and the environmental information.

3. The electronic control unit according to claim 1, further comprising:
    a storage unit that stores ranking information and ranking state information,
    wherein the ranking information is information in which values of the compensation parameters can be rearranged in an order of a magnitude of influence given to the transmission path,
    the ranking state information is information indicating a relationship among the ranking, the environmental information, and a state of the transmission path, and
    the determination unit determines a state of the transmission path based on the compensation parameter and the environmental information, with reference to the ranking information and the ranking state information.

4. The electronic control unit according to claim 3, wherein
    the collection unit collects speed information of the vehicle, and
    the determination unit offsets the ranking in accordance with a speed of the vehicle.

5. The electronic control unit according to claim 1, further comprising:
    a report unit that reports a state of the transmission path determined by the determination unit,
    wherein the report unit changes a report destination in accordance with a state of the transmission path.

6. The electronic control unit according to claim further comprising:
    an external environment communication unit that transmits the environmental information, a state of the transmission path determined by the determination unit, and information on a speed of the vehicle to an outside of the vehicle and receives the parameter correspondence information from an outside of the vehicle.

7. The electronic control unit according to claim 3, further comprising:
an external environment communication unit that transmits the environmental information, a state of the transmission path determined by the determination unit, and information on a speed of the vehicle to an outside of the vehicle and receives the ranking state information from an outside of the vehicle.

8. The electronic control unit according to claim 3,
wherein the determination unit determines a state of the transmission path based on transition of the ranking information.

9. A determination method performed by an electronic control unit mounted on a vehicle,
wherein the electronic control unit includes
a reception unit that receives a data signal transmitted via a transmission path mounted on the vehicle,
the reception unit includes an equalizer that compensates for the data signal, the method comprising:
acquiring, by reception unit, the environmental information of the vehicle, and
calculating, by the equalizer, a compensation parameter for compensating for the data signal, and
determining, by the equalizer, a state of the transmission path based on the compensation parameter and the environmental information.

* * * * *